(12) United States Patent
Nielsen et al.

(10) Patent No.: US 6,571,009 B1
(45) Date of Patent: May 27, 2003

(54) METHOD AND APPARATUS FOR ASSIGNING COLOR MANAGEMENT ACTIONS WITHIN A COMPUTING SYSTEM

(75) Inventors: Mary Nielsen, Eagle, ID (US); Michael Stokes, Boise, ID (US); Denise Zimmerman, Boise, ID (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/354,233

(22) Filed: Jul. 16, 1999

(51) Int. Cl.[7] .............................................. G06K 9/00
(52) U.S. Cl. ...................................... 382/162; 358/523
(58) Field of Search ............................... 382/162, 167; 358/523, 450, 518, 436; 348/223, 603; 345/589, 590, 600–604

(56) References Cited

U.S. PATENT DOCUMENTS

| | | | |
|---|---|---|---|
| 5,349,452 A | * | 9/1994 | Maeda et al. ............... 358/527 |
| 5,499,040 A | * | 3/1996 | McLaughlin et al. ....... 345/146 |
| 5,677,741 A | * | 10/1997 | Yui ............................ 348/649 |
| 6,240,204 B1 | * | 5/2001 | Hidaka et al. .............. 382/167 |
| 6,337,922 B2 | * | 1/2002 | Kumada ..................... 382/162 |
| 6,362,808 B1 | * | 3/2002 | Edge et al. ................. 345/153 |

* cited by examiner

Primary Examiner—Yon J. Couso

(57) ABSTRACT

The method of the invention adaptively assigns an image data color management action to a component of a computing system. The computing system includes control programs such as an application program and a peripheral driver program. The computing system further includes a peripheral device that may have both software color management capability and hardware color management capability. The method of the invention initially examines received image data to determine at least one characteristic thereof. The method then compares the characteristic with one or more decision parameters that enable an assessment of the complexity of the color management actions required for the image data. Thereafter, based upon the result of the comparing action, the image data is subjected to a color management action by a selected one of the control programs or by the peripheral device, dependent upon the determined complexity of the image data.

14 Claims, 2 Drawing Sheets

METHOD AND APPARATUS FOR ASSIGNING COLOR MANAGEMENT ACTIONS WITHIN A COMPUTING SYSTEM

FIELD OF THE INVENTION

This invention relates to the performance of color management actions in a computing system and, more particularly, to a method and apparatus which intelligently assigns color management actions to the component in the computing system that is best adapted to carry out the color management action, given the characteristics of a document to be processed.

BACKGROUND OF THE INVENTION

The term "color management", as applied to computer based systems, relates to management of color appearance via one or more color space conversions. Color management enables the color displayed on a user's monitor to remain true, and through the conversions to enable a printer or scanner to output a color, within its gamut limitations, that is consistent with the original image. In essence, color management involves one or more conversions of an image's color values in a first color space to another color space, for subsequent output by a printer or another monitor. For instance, color values produced by a processor are generally output in the red/green/blue (RGB) color space, whereas printer systems generally employ a cyan, magenta, yellow, black (CMYK) color space.

Each device in a computer-based printing system (including computers, printers, scanners, etc.) is associated with a "device profile" which defines how the particular device produces colors in a specific color space. Thus, when a succeeding device receives a "device profile" from a previous device, it compares its profile to the profile of the previous device, recognizes the differences and is then able to perform a color translation from the profile of the previous device to the profile of the succeeding device.

To enable interaction between multiple types of printers, scanners and host computers, etc., a color conversion is often accomplished from one color space to a widely recognized intermediate color space that is recognized as a standard. This intermediate color space is sometimes called the "CIELAB" color space. For example, a computer converts its color output values from the RGB color space to the CIELAB color space, knowing that many devices can convert the CIELAB color values directly to their specific device color spaces, as needed.

In the prior art, software applications generally arbitrarily decided whether the color management actions would be handled, in all cases, on the host processor by the application or by the printing device. Once that decision was made, it was carried forth in the same way in all subsequent color management actions. These solutions did not allow the color management actions to be intelligently distributed to take advantage of potential hardware capabilities, processing loads or image characteristics. Such systems also posed potential image quality problems, in that the processing on the host processor could produce significantly different visual results than if, for instance, an image was processed by the printing device.

Other prior art delegated the decision as to locale of a color management action to the device driver installed on the host processor. Again, such device drivers would decide whether the color management actions would be handled, in all cases, by the host processor or by the printing device. This action forced all color management processing to be performed, in its entirety, by either the host or the printing device.

Color management actions can vary from relatively simple to complex, depending upon the particular type of management that is desired. For instance, when converting an image from one color space to another color space, a number of "rendering intents" are often available in the color profiles. Three rendering intents are commonly employed. A first rendering intent is often called "perceptual" and enables translation of input colors to corresponding humanly perceived color values. The perceptual intent is often employed in the reproduction of photographs and other real life images. Another rendering intent is called "calorimetric" and provides very accurate (one-to-one) color translation from the input color space to the output color space. A third rendering intent is called "saturation" and provides bright colors in response to input color values from a source color space.

Certain documents to be subjected to a color management action may have multiple images that are to be subjected to different rendering intents or, by contrast, may have a unitary image whose color management will involve only use of a single rendering intent. Clearly, the processing of a single rendering intent for a single document is less computationally expensive than is processing of the input color space in accordance with plural rendering intents.

As indicated above, there are a number of color spaces that are utilized by various devices in currently available computational systems. The most common are red, green, blue and cyan, magenta, yellow and black. When converting from RGB to CMYK, the 3 colors (RGB) require "3 channels" for processing. To convert the RGB values to CMYK, 4 channels of processing are required. Other color systems require more channels (e.g., hexachrome requires 6 channels). The greater the number of channels, the more complex is the required processing. Further, the complexity of color management processing increases with the size of the image to be handled.

Accordingly, the fixed assignment procedures utilized for color management by the prior art have not provided sufficient flexibility to take into account the various complexities that may occur when dealing with documents that require color management. There is, therefore, a need for improved color management assignment functions which take into account various system capabilities and document/image complexities.

It is, therefore, an object of this invention to provide an improved method and apparatus for assigning color management actions within a computational system.

It is another object of this invention to provide an improved assignment procedure for determining where a color management action will be executed, basing such decision upon received image complexities.

SUMMARY OF THE INVENTION

The method of the invention adaptively assigns an image data color management action to a component of a computing system. The computing system includes control programs such as an application program and a peripheral driver program. The computing system further includes a peripheral device that may have both software color management capability and hardware color management capability. The method of the invention initially examines received image data to determine at least one characteristic thereof. The method then compares the characteristic with one or more decision parameters that enable an assessment of the complexity of the color management actions required for the image data. Thereafter, based upon the result of the comparing action, the image data is subjected to a color management action by a selected one of the control programs or by the peripheral device, dependent upon the determined complexity of the image data.

DETAILED DESCRIPTION OF THE INVENTION

Figure 1:
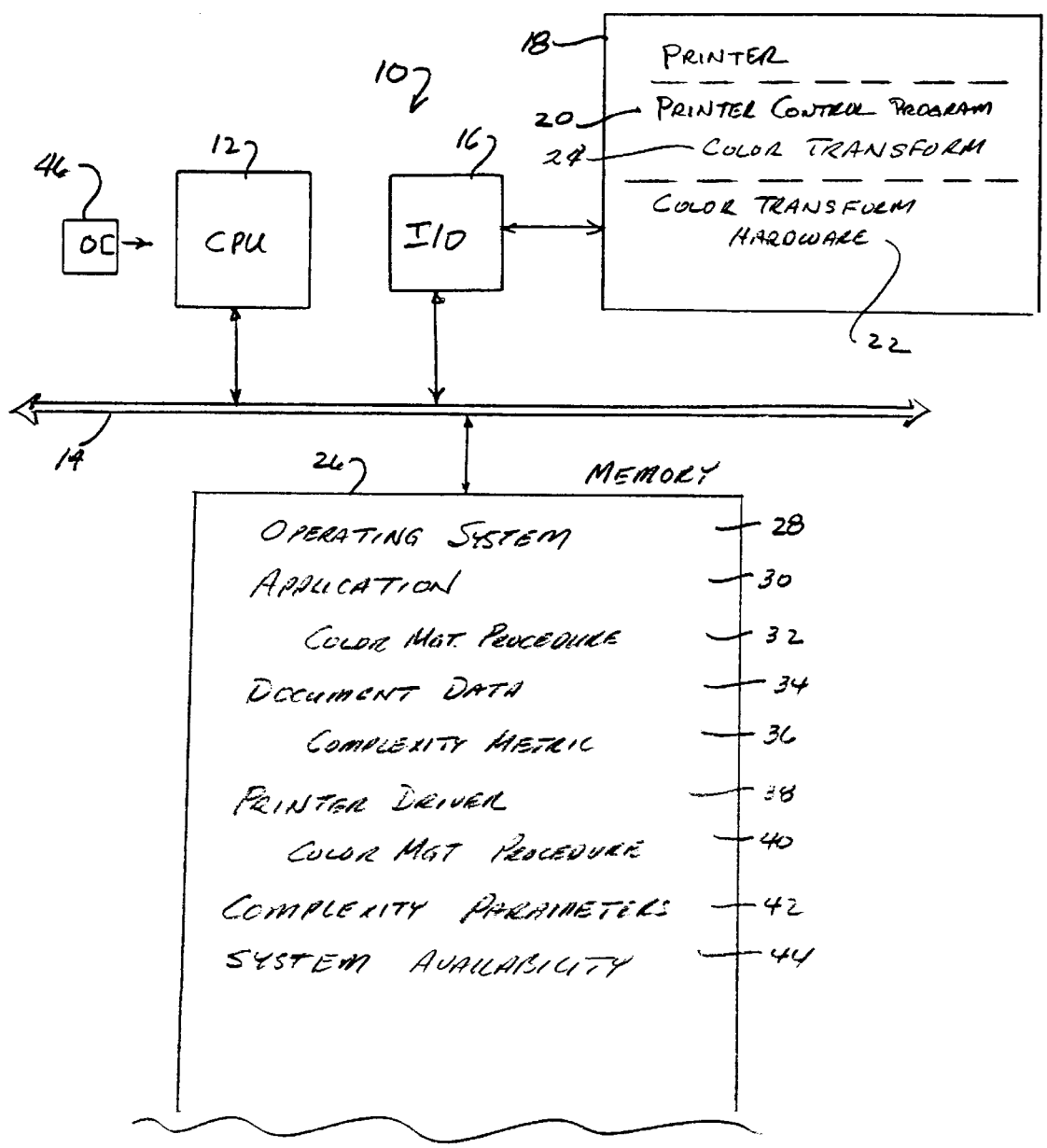
FIG. 1 is a high level block diagram illustrating a computing system adapted to carry out the invention.

Referring to FIG. 1, a high level block diagram of a computing system 10 is shown that incorporates the invention. Central processing unit (CPU) 12 is coupled via a bus system 14 to an input/output module 16 which communicates with a printer 18. Printer 18 includes printer control program 20 and, in certain instances, color transform hardware 22. Color transform hardware 22 is constructed to handle, with a high degree of processing efficiency and speed, certain color transforms. By contrast, printer control program 20 also includes additional color transform procedures 24. Those procedures are included for the purpose of handling infrequently experienced input color space values which must be then converted to printer color space values.

A memory 26, which incorporates both firmware and software, stores instructions and data required to operate computer 10 and to perform the color management functions that are executed therein. An operating system 28, in combination with CPU 12, controls overall functioning of computer 10 and its interrelationships with printer 18. An application 30 (e.g., a word processing application, a presentation preparation application, etc.) is also provided with a color management function 32.

The output of application 30 is document data 34 which is associated by color management function 32 with a document complexity metric 36. Document complexity metric 36 comprises one or more values that are required for the color management functions to determine where the color management actions are to be performed with respect to document data 34. Specific examples of such complexity metrics will be given below.

A printer driver procedure 38 is also resident in memory 26 and, itself, includes a color management function 40. Also contained within memory 26 are one or more complexity parameters employed by each color management function to enable a determination as to whether the particular software/firmware function should or should not carry out its resident color management action with respect to particular document data. Examples of such complexity parameters 42 will be given below. Finally, memory 26 also includes system availability indications 44 that aid the various color management procedures in assigning where color management functions are to be performed with respect to a particular document.

Hereafter, it will be assumed that the color management assignment functions are distributed amongst application 30 and printer driver 38, however, it is to be understood that the color management assignment functionality can be configured into a single unified program, if so desired. By causing the color management assignment functionality to be distributed, however, the amount of communication required between application 30, printer driver 38 and printer 18 is lessened. For example, printer driver 38 is aware of: the device profile of printer 18; the availability status of printer 18; and other print jobs resident in a print queue, awaiting execution by printer 18. Application 30, on the other hand, is aware of the availability of operating system 26 to oversee a color management action should it be decided that the color management action is to be performed locally by application 30.

The distributed nature of the color management assignment function also reduces the amount of intercommunication required between the individual components of computer system 10 and conserves processing assets for other applications. By contrast, a unified color management assignment procedure may require less memory space.

Hereafter, while it will be assumed that each of the software components is already loaded into memory 26, it is to be understood that such software can be maintained on a memory device 46 for use with CPU 12 on an as-needed basis.

Figure 2:
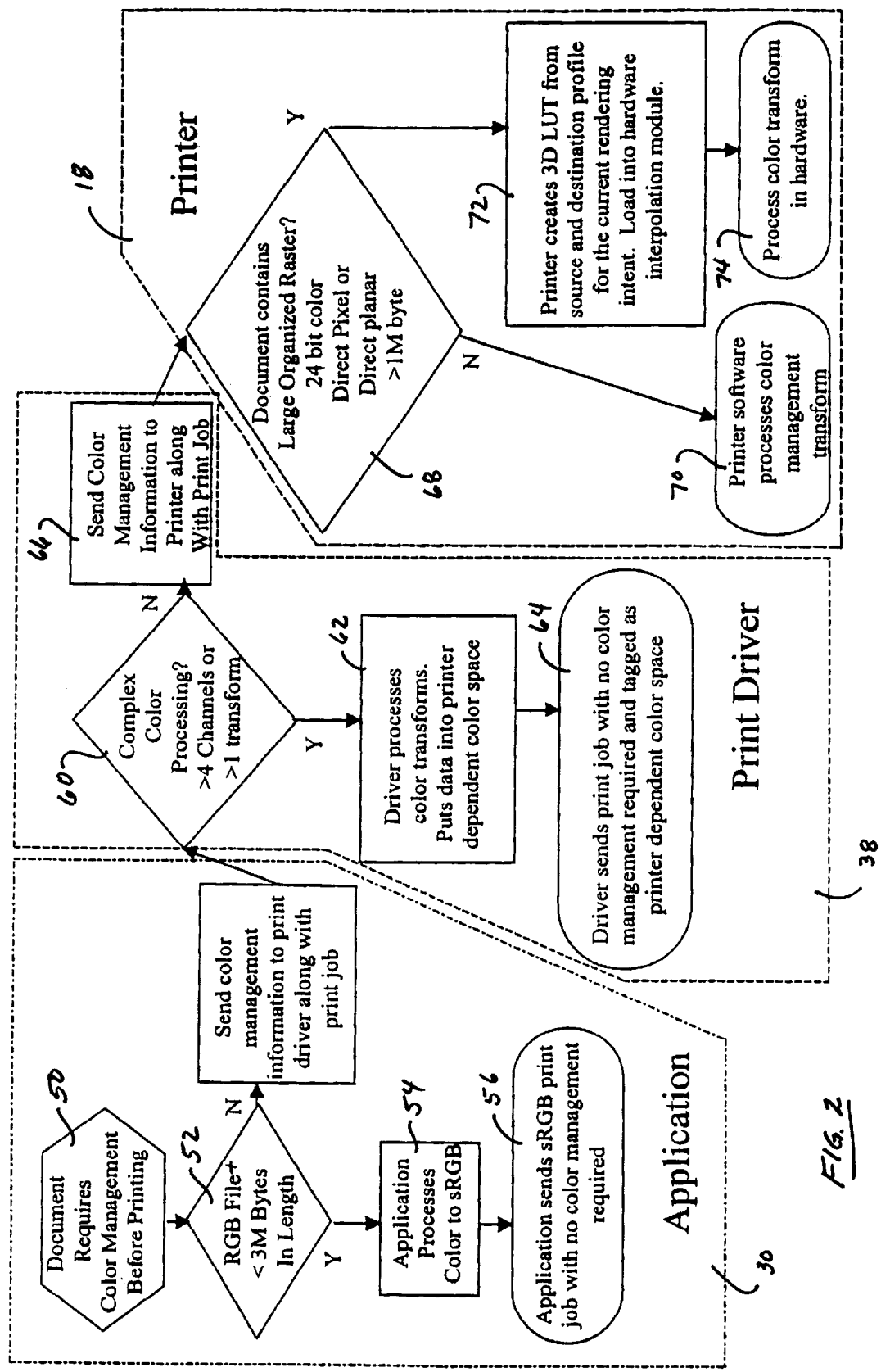
FIG. 2 is a logical flow diagram giving an example of the color management actions performed by the system of FIG. 1.

Turning now to FIG. 2, an example will be described of a color management decision process in accordance with the invention. Hereafter, the term "transform" will be used to refer to a unique combination of (i) source color profile, (ii) rendering intent and (iii) a destination color profile. The color management information accompanying a document or an image will include (i) a source color profile, (ii) rendering intent and, (iii) optionally, a destination color profile.

As shown in step 50, a document requiring color management is produced by application 30 (FIG. 1). Step 52 examines the document data set and determines if it is an RGB file and is less than three megabytes in length (step 52). If yes, the application processes the color values of the document (step 54), utilizing the color management information that accompanies the document. In this instance, the decision is made to process the color transform action using color management procedure 32 (associated with application 30) due to the fact that the small size of the file allows the color management action to be performed rapidly, with little affect on the processing actions of CPU 12. Further, since additional data would need to be attached to the RGB file, were the color management action to be performed in either print driver 38 or printer 18, the resulting expansion in size of the document file would place an unnecessary burden on the system (given the speed at which the color transform action can be accomplished by color management program 32).

The color management actions taken by color management procedure 32 (associated with application 30), cause the print job to be converted into a printer default calibrated color input space. Thus, when the document file is received by printer 18, it is in such a format that no further color management actions are required (step 56).

Returning back to step 52, if it is determined that the file size is equal to or greater than three megabytes or is not RGB, the color management information is appended to the document file and is transmitted to print driver 38 (step 58). Print driver 38 then invokes color management procedure 40 which examines the color management information, along with the document data file to determine if a "complex" color processing action is required (decision step 60).

A complex color processing action is defined as one that requires greater than four channels of color data or greater than a single transform. Thus, if more than four colors are required or the document requires more than one rendering intent, then the color processing actions are carried out by print driver 38. In this regard, print driver 38 (and color management procedure 40) processes the color transforms to put the color data into the printer dependent color space, in accordance with the destination profile and rendering intent accompanying the document data(steps 62). Thereafter, print driver 38 sends the document data set to printer 18, with flags indicating that no color management action is required, and that the document data set has been processed to reflect a full gamut printer device-dependent color space (step 64). Receiving such a document data record, printer 18 is able to directly process the document data for the print engine, without performing a color management action.

The above indicated action avoids sending a document data set to printer 18 which requires complicated color management processing. Further it maintains the complicated processing actions within print driver 38 which, itself, is able to access CPU 12 assets to aid in processing the document data set. Also, it avoids loading printer 18 with many complex procedures that may be required only rarely or intermittently.

Returning to decision step 60, if it is determined that complex color processing is not required, the color management information along with the document data set is sent to printer 18 (step 66). Upon receiving the document data set, printer 18 follows one of two decision paths. Decision step 68 determines if the document contains a large organized raster. Such an image is defined as including 24 bit color data (i.e., 3 color bytes) and the color values are organized by pixel or color planes and the total image is greater in size than one megabyte (decision step 68).

If the document data set is determined not to include a large organized raster, it is processed by the printer software 24 which, in turn, performs the necessary color management transform action (step 70).

If it is determined that the document data set contains a large organized raster, step 68 directs the processing in a direction to enable the color transform action to be carried out by color transform hardware 22 incorporated into printer 18. Hardware processing allows the color transform action to occur in a more rapid fashion. More particularly, as shown in step 72, printer 18 creates a three-dimension look-up table from the source and destination color profile data, utilizing a selected set of the profile data (based on the rendering intent). Thus, while 24 bit color values provide a maximum of 256×256×256 (16,777,216) possible colors to create a 3 dimensional look up table, using all 16,777,216 values would require a very large memory in printer 18. Accordingly, the 3 D look-up table is constructed by sampling the color space to create, for example, a 17×17×17 grid table of color values.

Accordingly, an input color value is utilized to address the 3 D look-up table which, in turn, produces an output destination color value. As, in most cases, the input color value will not directly match an input value for the table, the bounding input color values and the corresponding bounding output color values are accessed. Then an interpolation is performed on the bounding output color values to enable a corresponding output color value to be determined (step 72).

Accordingly, once the 3 D look-up table is set up, the input colors contained in the document data set are run through an interpolation module contained within color transform hardware 22 so as to achieve the conversion of the input color space values to the printer color space values (step 74).

As can be seen from above, the color management decision process, and the example shown in FIG. 2, is carried out in application 30, if the document data file is relatively small. If, however, the document data file is larger than a threshold value, and requires more than four channels or more than one transform, its complexity dictates that the color management actions be carried out by the print driver. Printer 18 is thus required only to process the intermediate complexity color management actions and is left to decide whether to handle the input color data in either hardware or through software manipulation (depending upon whether the document data set includes a large organized raster or not).

While the procedure shown in FIG. 2 assumes a distributed color management decision process, such decision process may be centralized. For instance, an application with intelligent color management procedures can determine, based upon a set of heuristics, how to distribute the color management processing to optimally take advantage of available resources or, simply, to optimize quality or performance. For instance, the application can determine whether to color manage within its own processing capability, to defer color management to the print driver or to perform the color management using some combination of processing capabilities. For example, the document data set can be partially color managed within the application and the remaining color management actions then deferred to either the operating system or the print driver.

For example, if a presentation document has a large number of objects and they are all of different color type, the application can inquire if the printer is already able to handle standard RGB format data and then choose to color manage directly within the application and convert the data to the printer standard RGB format. This action will defer the final standard RGB-to-printer color conversion to be handled by the printer hardware and maintains reasonably device-independent colors within the application for publication either to other printers or to the worldwide web, if needed. If, however, the presentation has a large number of objects that are of similar color type, the color management actions may better be performed within the print driver. Accordingly, there are many combinations and permutations of decision making which can occur, depending upon the specific capabilities of the application, the print driver, the printer and, potentially, the operating system.

In contrast to currently known prior art, wherein color processing requires that all decisions be made by the user up front, before processing commences, this invention enables the color management action decision making process to be deferred until the characteristic of the document to be processed, and the processing capabilities of the application, print driver, operating system and printer are known. In such case, the color management decision process is adaptively made, based upon the aforesaid characteristics and capabilities of the document dataset.

It should be understood that the foregoing description is only illustrative of the invention. Various alternatives and modifications can be devised by those skilled in the art without departing from the invention. For example, while the invention has been described in the context of a system including a printer or scanner, it is to be understood that the invention is equally applicable to color management actions between printer to printer, display to multiple printers, scanner to display, camera to display, camera to printer, etc. Further, while it has been assumed that the image being processed is associated with an explicit profile or rendering intent, if such is not the case, a rendering intent or profile may be assumed and associated with the image.

Accordingly, the present invention is intended to embrace all such alternatives, modifications and variances which fall within the scope of the appended claims.

What is claimed is:

1. A method for adaptively assigning an image data color management action to a component of a computing system, said computing system including a peripheral device and control programs, said control programs comprising an application program, an operating system, and a peripheral driver program, said method comprising the steps of:

a) examining said image data to determine at least one characteristic thereof;

b) comparing said characteristic with one or more decision parameters; and c) selecting one of said control programs or said peripheral device based on said comparing step, and causing said image data to be subjected to said color management action by the selected one of said control programs or said peripheral device, wherein said examining and comparing steps a) and b) determine if said image data comprises a source color file that is larger in size than a threshold value and, if not, step c) causes a color management action to be performed on said image data file by said application program, wherein said examining and comparing steps a) and b) determine if said image data requires more than a single transform of source color to destination color space, or requires more than four color channels and, if yes, causes step c) said peripheral driver program to carry out a color management action with respect to said image data, and wherein said examining and comparing steps a) and b) are carried out in said peripheral device which, based upon whether or not said image data includes an organized raster embodying a color size greater than a threshold value and a data segment size greater than a segment size threshold value, determines whether to perform a color management action through the use of a software conversion procedure or through use of hardware employed for such color management action.

2. The method as recited in claim 1, wherein said examining step a) is carried out in each of said application program, said peripheral driver program and in said peripheral device, with each examining action determining a different characteristic of said image data in order enable a subsequent color management action decision to be made.

3. The method as recited in claim 1 wherein steps a)–c) are carried out, substantially, within said application program, or said peripheral driver program.

4. A memory media including instructions for controlling a computing system to adaptively assign an image data color management action to a component of said computing system, said computing system including a peripheral and control programs, said control programs comprising an application program, an operating system, and a peripheral driver program, said memory media comprising:

a) means for controlling said computing system to examine said image data to determine at least one characteristic thereof;

b) means for controlling said computing system to compare said characteristic with one or more decision parameters; and c) means for controlling said computing system to select one of said control programs or said peripheral device based on said comparing step, and for causing said computing system to cause said image data to be subjected to said color management action by the selected one of said control programs or said peripheral device, wherein means a) and b) control said computing system to determine if said image data comprises a source color file that is larger in size than a threshold value and, if no means c) causes a color management action to be performed on said image data file by said application program, wherein means a) and b) control said computing system to determine if said image data requires more than a single transform of source color to destination color space, or requires more than four color channels and, if yes, causes means c) to control said peripheral driver program to carry out a color management action with respect to said image data, and wherein means a) and b) control said computing system to determine in said peripheral device whether or not said image data includes an organized raster embodying a color size greater than a threshold value and a data segment size greater than a segment size threshold value, and based on such determination, whether to perform a color management action through the use of a software conversion procedure or through use of hardware employed for such management action.

5. The memory media as recited in claim 4, wherein said means a) controls said computing system to determine, in each of said application program, said peripheral driver program and in said peripheral device, a different characteristic of said image data in order enable a subsequent color management action decision to be made.

6. The memory media as recited in claim 4 wherein means a)–c) control said computing system to carry out their respective recited actions, substantially, within said application program, or said peripheral driver program.

7. A memory media having instructions stored thereon to:

examine image data to determine at least one characteristic thereof;

compare the at least one characteristic with one or more decision parameters; and, select one of a plurality of control programs or a peripheral device based on having compared the at least one characteristic with one or more decision parameters, and cause the image data to be subjected to an image data color management action by the selected one of the plurality of control programs or the peripheral device, wherein one of the plurality of control programs is selected where the image data includes an organized raster embodying a color size greater than a threshold value and a data segment size greater than a segment size threshold value, and otherwise the peripheral device is selected.

8. The memory media of claim 7, wherein one of the plurality of control programs is selected where the image data comprises a source color file larger in size than a threshold value, and the peripheral device is selected where the source color file is less than or equal to in size and the threshold value.

9. The memory media of claim 7, wherein one of the plurality of control programs is selected where the image data requires more than a single transform of source color to destination color space, and the peripheral device is selected where the image data requires only a single transform of source color.

10. The memory media of claim 7, wherein one of the plurality of control programs is selected where the image data requires more than four color channels, and the peripheral device is selected where the image data requires less than or equal to four color channels.

11. A system comprising:

a peripheral device; and, a computing system having a plurality of programs, one of the programs examining image data generated within the computing system to determine at least one characteristic thereof and compare the at least one characteristic with one or more decision parameters to select another of the plurality of programs or the peripheral device to which to subject the image data to an image data color management action, wherein another of the plurality of programs is selected where the image data includes an organized raster embodying a color size greater than a threshold value and a data segment size greater than a segment size threshold value, and otherwise the peripheral device is selected.

12. The system of claim 11, wherein another of the plurality of programs is selected where the image data comprises a source color file larger in size than a threshold value, and the peripheral device is otherwise selected.

13. The system of claim 11, wherein another of the plurality of programs is selected where the image data requires more than a single transform of source color to destination color space, and the peripheral device is otherwise selected.

14. The system of claim 11, wherein another of the plurality of programs is selected where the image data requires more than four color channels, and the peripheral device is otherwise selected.

* * * * *